United States Patent [19]

Domeier

[11] Patent Number: 4,579,890

[45] Date of Patent: Apr. 1, 1986

[54] CURABLE MOLDING COMPOSITIONS CONTAINING A POLYESTER RESIN

[75] Inventor: Linda A. Domeier, Somerville, N.J.

[73] Assignee: Union Carbide Corporation, Danbury, Conn.

[21] Appl. No.: 545,606

[22] Filed: Oct. 27, 1983

Related U.S. Application Data

[63] Continuation of Ser. No. 279,447, Jul. 1, 1981, abandoned.

[51] Int. Cl.[4] .................. C08L 67/00; C08K 3/04; C08K 3/40
[52] U.S. Cl. .................. 523/512; 523/514; 523/515; 523/516; 523/523; 523/527; 525/48
[58] Field of Search .............. 525/170, 48; 523/512, 523/527, 523, 514-516

[56] References Cited

U.S. PATENT DOCUMENTS

| | | | |
|---|---|---|---|
| 3,628,963 | 12/1971 | Akamatsu et al. | 204/159.16 |
| 3,760,033 | 9/1973 | Arbuckle et al. | 204/159.15 |
| 3,922,247 | 11/1975 | Hazen et al. | 525/170 |
| 3,997,627 | 12/1976 | Ichimura et al. | 525/303 |
| 4,048,257 | 9/1977 | Stevenson | 260/40 R |
| 4,104,241 | 8/1978 | Roberts et al. | 525/76 |
| 4,131,635 | 12/1978 | Wilschut | 525/170 |
| 4,172,102 | 10/1979 | Hoene et al. | 525/80 |
| 4,245,059 | 1/1981 | Ichimura | 525/170 |
| 4,293,686 | 10/1981 | Gardner | 525/48 |
| 4,294,751 | 10/1981 | Gardner | 525/48 |
| 4,294,941 | 10/1981 | Owen | 525/170 |
| 4,315,964 | 2/1982 | Ozaki et al. | 428/184 |
| 4,316,835 | 2/1982 | Gardner | 523/527 |
| 4,322,334 | 3/1982 | Arakawa et al. | 523/512 |
| 4,374,215 | 2/1983 | Atkins | 523/527 |

OTHER PUBLICATIONS

194656a, Wood—Plastic Composite Boards, Kinuhara, Kazuo; Harada, Osamu (Chugoku Marine Paints, Ltd.) Japan, Kokai 75 88,192, Jul. 15, 1975, Appl. 73 140,089, Dec. 10, 1973; 3 pages.

116082w, Unsaturated Polyester Compositions, Suzuki, Hajime; Miyake, Hideo; Choyobo Co. Ltd.; Japan, Kokai 75 67,891, Jun. 6, 1975, Appl. 78 118,816, Oct. 22, 1975, 9 pages.

61915n, Varnish Composition, Allard, Maxime; Moreau, Pierre (Helic-Van Cauwenberghe) Fr. Demande 2,228,095, Nov. 29, 1974, Appl. 73 15,927, May 3, 1973; 6 pages.

Primary Examiner—Herbert J. Lilling
Attorney, Agent, or Firm—Morris N. Reinisch

[57] ABSTRACT

Described herein are curable molding compositions comprising a mixture of:

(a) an unsaturated polyester;

(b) acrylic or methacrylic acid or a functionalized derivative thereof having a molecular weight of less than 300;

(c) an ethylenically unsaturated monomer which is soluble in and copolymerizable with (a) and (b) and which is different from (b); and (d) one or more fibers with a melting point or a glass transition temperature above about 130° C.

18 Claims, No Drawings

CURABLE MOLDING COMPOSITIONS CONTAINING A POLYESTER RESIN

This application is a continuation of prior U.S. application Ser. No. 279,447, filing date 7/1/81, now abandoned.

This invention is directed to a curable molding composition containing (a) an unsaturated polyester, (b) acrylic or methacrylic acid or functionalized derivatives thereof, (c) an ethylenically unsaturated monomer which is soluble in and copolymerizable with (a) and (b) and which is different from (b), and (d) one or more fibers with a melting point or a glass transition temperature above about 130° C.

The combination of components in the composition of this invention have been found to produce reinforced articles having a particularly good balance of mechanical properties. Molded reinforced articles may be produced from the composition of this invention by a very rapid mold cycle which is typically less than about 2 minutes from the time the cure of the resin is initiated.

Unsaturated polyesters are well known and useful for a wide variety of applications. Typically, these unsaturated polyesters are formed by reacting an unsaturated diacid or anhydride with a nearly equivalent amount of dihydric alcohol at temperatures above about 200° C. for several hours. Maleic anhydride is the most common unsaturated component utilized.

The unsaturated polyester can be mixed with an ethylenically unsaturated monomer, such as styrene, which copolymerizes with the unsaturated polyester on curing and provides resin solutions of lower viscosity than the neat unsaturated polyester.

Unreinforced castings of polyester resins are generally brittle and unsuitable for use in load bearing applications. They are usually combined with fiber and fillers to give compositions with increased stiffness and strength.

Unsaturated polyesters have also been used together with a combination of different monomers. Numerous graft copolymers of unsaturated polyesters with acrylic monomers are used in coatings. Resin solutions of the polyesters and acrylic monomers are also used to impregnate surfaces and form coatings. For example, C.A.. 83:194656a describes a photocurable resin solution containing an unsaturated polyester, styrene, ethyl acrylate, benzoin methyl ether and a peroxide. This resin solution is used to coat wood-plastic composite boards.

C.A. 83:116082w describes an unsaturated polyester resin composition containing an unsaturated polyester, styrene, and ethylene glycol monomethylacrylate which is used to form coatings.

C.A. 83:61915n describes a varnish composition containing an unsaturated polyester, styrene, and 2-ethylhexyl acrylate or butyl acrylate U.S. Pat. No. 3,760,033 describes curable coating compositions based on an unsaturated polyester resin and styrene to which an unsaturated hydroxy ester, particularly β-hydroxyethyl methacrylate or β-hydroxypropyl methacrylate is added.

THE INVENTION

It has now been found that when a comonomer, i.e., acrylic or methacrylic acid or functionalized derivatives thereof, is added to a polyester resin containing an unsaturated polyester and an ethylenically unsaturated monomer, the resulting molding composition produces reinforced articles having substantially improved mechanical properties over those of composites which do not contain these particular comonomers.

These improved composite mechanical properties make these resins especially suitable for the rapid production of glass-reinforced composites via the molding technology described below.

The improved curable molding composition of this invention comprises a mixture of (a) an unsaturated polyester, (b) acrylic or methacrylic acid or a functionalized derivative thereof having a molecular weight of less than 300, (c) an ethylenically unsaturated monomer which is soluble in and copolymerizable with (a) and (b) and which is different from (b), and (d) one or more fibers having a melting point or a glass transition temperature above about 130° C.

The instant resin compositions comprising components (a), (b), and (c) have low viscosities, i.e., less than about 150 centipoise, preferably less than 100 centipoise, so that they can be used to produce thermoset resin articles containing up to about 75 weight percent of reinforcing fibers by a very rapid mold cycle.

The thermosetting unsaturated polyesters suitable for use herein are well known commercially available materials. They are typically the condensation product of a diol with a difunctional unsaturated carboxylic acid or anhydride. The diol is generally selected from ethylene glycol, diethylene glycol, propylene glycol, dipropylene glycol, neopentyl glycol, alkoxylated derivatives of bisphenol-A, 2,2,4-trimethyl-1,3-pentanediol and 1,3-butanediol. The unsaturated acids include maleic acid and fumaric acid. Acids without reactive double bonds, i.e., ethylenically unreactive, which may be used in modifying amounts include phthalic acid, isophthalic acid, terephthalic acid, and adipic acid. Anhydrides of the above, such as maleic anhydride and phthalic anhydride are often used. Additionally, mixtures of diols and unsaturated and saturated acid components can be used.

The unsaturated polyesters are generally prepared by heating approximately equimolar amounts of the diol with the carboxylic acid or anhydride at temperatures in excess of about 200° C. for periods of 4 to 24 hours. The polyesters typically have number average molecular weights (Mn) in the range of from about 500 to about 5000, and they contain unsaturation distributed along the polyester chain. These polyesters have acid numbers in the range of from about 8 to about 50. (The acid number is the milligrams of potassium hydroxide needed to neutralize one gram of sample). Many of the polyesters have hydroxyl numbers approximately equal to or greater than their acid numbers.

Component (b) in the composition of this invention is acrylic or methacrylic acid or functionalized derivatives thereof. Mixtures of these may also be used. The functionalized derivatives are characterized by the presence of acrylate, methacrylate, acrylamide, and methacrylamide groups and also by the presence of functional groups such as hydroxyl, amino, alkylamino, ether, and epoxide, for example. The molecular weight of these monomers is typically less than 300. Preferred monomers are characterized by the following formula:

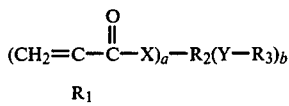

$$(CH_2=C-C-X)_a-R_2(Y-R_3)_b$$
$$R_1$$

wherein $R_1$ is independently hydrogen or methyl; X and Y are independently —O— or

$$R_4$$
$$|$$
$$N-$$

wherein $R_4$ is hydrogen or lower alkyl; $R_2$ is an aliphatic or aromatic radical containing from 2 to about 10 carbon atoms, optionally containing —O— or —N—; $R_3$ is hydrogen or an aliphatic or aromatic radical containing from 1 to 10 carbon atoms; and a and b are integers of or greater than 1, preferably 1 to 3.

These functionalized derivatives of acrylic or methacrylic acid include 2-hydroxyethyl acrylate, 2-hydroxyethyl methacrylate, hydroxypropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of Formula I may also be included.

Component (c) of this invention is an ethylenically unsaturated monomer which is soluble in and copolymerizable with (a) and (b) and which is different from (b).

These ethylenically unsaturated monomers contain at least a single —CH=C< group, and preferably a $CH_2$=C< group and include styrene and its derivatives and homologues, divinylbenzene, diallylphthalate, non-functionalized esters of acrylic or methacrylic acid (such as ethyl acrylate, butyl acrylate, and methyl methacrylate), unsaturated nitriles (such as acrylonitrile and methacrylonitrile), and the like. Also, the monomers include vinyl esters, e.g., vinyl acetate, vinyl propionate, and the like. Mixtures of the aforementioned monomers may be effectively employed in the practice of this invention.

The most preferred ethylenically unsaturated monomer contemplated in the practice of this invention is styrene.

In the resin portion of the composition of this invention component (a) is present in amounts of from about 10 to about 75, preferably from about 25 to about 60 weight percent; component (b) is present in amounts of from about 2 to about 75, preferably from about 5 to about 30 weight percent; and component (c) is present in amounts of from about 10 to about 75, preferably from about 25 to about 65 weight percent.

The fibers of component (d) have a melting point or a glass transition temperature above about 130° C. These fibers include fiberglass, carbon fibers, aromatic polyamide fibers (such as aramid fibers sold by E. I. duPont de Nemours and Company, Wilmington, Del., under the trademark of Kevlar), metal fibers such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention preferably have a length of at least ¼ inch, and an average length of at least 178 inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The composition contains from about 10 to about 75, preferably from about 40 to about 70 weight percent of the reinforcement fiber or from about 20 to about 40 weight percent of milled glass reinforcement.

A free-radical curing catalyst which initiates curing via the co-reaction of the polyester, the acrylic or methacrylic acid or functionalized derivatives thereof, and the ethylenically unsaturated monomer is included in this invention. These curing catalysts include azo compounds, peroxides, peresters, perketals, and the like.

Azo and peroxide curing agents are described by, for example, Gallagher, et al. "Organic Peroxides Review, Plastics Design and Processing, July, 1978, pages 38–42, and August, 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Examples of such curing catalysts include 1,1-di-t-butylperoxycyclohexane, 2,2-di-t-butylperoxybutane, 2,2-di-t-butylperoxy-4-methylpentane, 2,2-dicumylperoxypropane, butyl 2,2-di-t-butylperoxyvalerate, 1,1-bis(2,2,4-trimethylpentyl-2-peroxy)cyclohexane, 2,2'-azo-bis-isobutyronitrile, dibenzoyl peroxide, lauroyl peroxide, di-t-butyl peroxide, diisopropyl peroxide carbonate, t-butylperoxy-2-ethylhexanoate, t-butylperpivalate, 2,5-dimethylhexane-2,5-di-per-ethylhexanoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butylcyclohexyl)peroxydicarbonate, methyl ethyl ketone peroxide, 2,4-pentanedione peroxide, bis(t-butylperoxy)-diisopropylbenzene, 2,4,4-trimethylpentyl-2-peroxycyclohexane carboxylate, 2-t-butylazo-2-cyano-4-methylpentane, ethyl 3,3-di(t-butylperoxy)butyrate, and the like. These are commercially available materials.

The peresters and perketals may be used in combination with an acid cure accelerator as described in Netherlands published Patent Application No. 7604405. These acids include Bronsted acids with a $pk_a$ value lower than or equal to that of formic acid, such as hydrochloric acid, sulfuric acid, nitric acid, phosphoric acid, trichloroacetic acid, p-toluenesulfonic acid, and the like. Also Lewis acids or metal halides with Lewis acid properties, such as boron trifluoride and the chlorides of iron, cobalt, zinc and aluminum, may be used.

Additionally, the above described curing catalysts may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of the curing catalysts may be used herein, such as mixtures of peresters and/or perketals, of perketals and azo compounds, and of peresters and azo compounds.

The concentration of the curing agent can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b) and (c).

The resin portion of the compositions of this invention is prepared by solution blending the unsaturated polyester, the acrylic or methacrylic acid or functionalized derivatives thereof, the ethylenically unsaturated monomer, a free radical curing catalyst, and any other optional ingredients at ambient temperatures.

It is, furthermore, desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butylhydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c).

The composition of this invention may also include other ingredients, such as mold release agents, and the like.

A preferred procedure for producing a molded article from the compositions of this invention is described in U.S. patent application Ser. No. 134,906 entitled "Molding Process and Apparatus Therefore", filed on Apr. 14, 1980, now abandoned, in the name of R. Angell, Jr., which is incorporated herein by reference. In this application, a process for rapidly fabricating fiber reinforced thermoset resin articles is described. The fiber reinforcement is comprised of one or more fibers with a melting point or a glass transition temperature above about 130° C. The process comprises the steps of (a) providing one or more fibers with a melting point or a glass transition temperature above about 130° C. in the form of an interlocked mass in a heatable matched metal die mold, (b) providing in one or more accumulator zones, a liquid body of a thermosettable organic material having a viscosity determined at 120° C., in the absence of curing agent therefore, of less than about 50 centipoise, and which is curable upon heating to a thermoset resin composition, the viscosity of said liquid body being maintained essentially constant in the accumulator zone by keeping its temperature below that at which curing of said material is substantial, (c) closing the mold containing the web, (d) injecting at least a portion of said thermosettable organic material under pressure from said accumulator zone(s) into the mold to thereby fill the cavity in said mold, (e) initiating the curing of said material in said mold by subjecting the material to a temperature above the temperature at which the curing of said material is initiated, by heating the mold, and (f) opening said mold and removing the cured thermoset article therefrom.

In said U.S. patent application Ser. No. 135,906 the apparatus comprises: (a) a heatable matched die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, (d) cooling means associated with the means for controlling the injection of such liquid to such cavities, whereby the temperature of the liquid in such injection means is maintained substantially below the temperature of the mold.

EXAMPLES

The following examples serve to illustrate specific embodiments of this invention and it is not intended that the invention shall be limited by the examples.

In the examples the flexural strength and modulus of the prepared composites were measured according to the procedure described in ASTM D-790. In each example, five separate flexural bars were tested from each plaque and the values listed are the average of those tests.

In each of the following examples a thermocouple was inserted in the mold midway through the glass mat and the cure rate was observed by measuring the time from resin injection to the time of maximum exotherm in the resin. This time span is designated below as the time to peak exotherm and the time given is an average of several runs. The apparatus used was similar to that described in U.S. patent application Ser. No. 135,906 described, supra.

In the examples the following designations are used:

Polyester resin 1—A solution containing styrene and an unsaturated polyester prepared from maleic anhydride, phthalic acid, propylene glycol, and diethylene glycol. The polyester has an acid number of about 25, and a number average molecular weight (Mn) of about 2400. This polyester is commercially available as USS 14107 polyester resin (available from U.S. Steel Corp.). It was diluted with styrene to form a 50/50 polyester/styrene solution used as Polyester resin 1.

Polyester resin 2—A solution containing styrene and an unsaturated polyester prepared from maleic anhydride, phthalic acid, propylene glycol, and dipropylene glycol. The polyester has an acid number of about 25, and Mn of about 1900. This polyester is commercially available as USS 13017 polyester resin (available from U.S. Steel Corp.). It was diluted with styrene to form a 50/50 solution used as Polyester resin 2.

Polyester resin 3—A solution containing styrene and an unsaturated polyester prepared from maleic anhydride, phthalic acid, and propylene glycol. The polyester has an acid number of about 32, and Mn of about 1400. This polyester is commercially available as USS 13031 polyester resin (available from U.S. Steel Corp.). It was diluted with styrene to form a 50/50 polyester/styrene solution used as Polyester resin 3.

CONTROL A

Approximately 200 grams (approximately ten 10×5½ inch sheets) Type AKM glass mat (PPG Industries, Inc., Pittsburgh, Pa.) was placed in a 10×5½×3/16 inch mold preheated to 140° C. The mold was closed, evacuated for about 5 seconds, and a resin portion containing 100 weight percent Polyester resin 1, 0.5 phr Zelec UN mold release (an organophosphate mold release sold by E. I. duPont de Nemours, Wilmington, Del.), and 1.5 phr of 1,1-di-t-butylperoxy-3,3,5-trimethylcyclohexane (Trigonox 29-B-75 sold by Noury Chemical Corp., Burt, N.Y.) was injected at a pressure of 300 psi into the mold. The pressure was maintained for a dwell period of 10 seconds. A time to peak exotherm of about 35 seconds was measured. After 65 seconds, the cured glass reinforced composite was removed from the mold. The composite contained 65 weight percent glass as determined by ashing.

The composite was tested for flexural strength and modulus.

The results are shown in Table I.

EXAMPLE 1

The procedure of Control A was repeated except that the resin contained the following ingredients:
80 wt. percent Polyester resin 1,
20 wt. percent 2-hydroxyethyl acrylate,
1.5 phr Trigonox 29-B-75, and
0.5 phr Zelec UN mold release.

A time to peak exothern of about 46 seconds was observed.

The cured composite was removed from the mold after 65 seconds and tested as described in Control A.

The results are show in Table I.

EXAMPLE 2

The procedure of Control A was repeated except that the resin contained the following ingredients:
80 wt. percent Polyester resin 1,
20 wt. percent 2-hydroxyethyl methacrylate,
1.5 phr Trigonox 29-B-75, and
0.5 phr Zelec UN mold release.

A time to peak exothern of about 38 seconds was observed.

The cured composite was removed from the mold after 56 seconds and tested as described in Control A.

The results are show in Table I.

CONTROL B

The procedure of Control A was repeated except that the resin contained the following ingredients:
100 wt. percent of Polyester resin 2,
1.5 phr of Trigonox 29-B-75, and
0.5 phr of Zelec UN mold release.

A time to peak exothern of about 39 seconds was observed.

The cured composite was removed from the mold after 57 seconds and tested as described in Control A.

The results are shown in Table I.

EXAMPLE 3

The procedure of Control A was repeated except that the resin contained the following ingredients:
80 wt. percent of Polyester resin 2,
20 wt. percent of 2-hydroxyethyl acrylate,
1.5 phr of Trigonox 29-B-75, and
0.5 phr of Zelec UN mold release.

A time to peak exotherm of about 37 seconds was observed.

The cured composite was removed from the mold after 57 seconds and tested as described in Control A.

The results are shown in Table I.

EXAMPLE 4

The procedure of Control A was repeated except that the resin contained the following ingredients:
80 wt. percent of Polyester resin 2,
20 wt. percent of 2-hydroxyethyl methacrylate,
1.5 phr of Trigonox 29-B-75, and
0.5 phr of Zelec UN mold release.

A time to peak exotherm of about 46 seconds was observed.

The cured composite was removed from the mold after 60 seconds and tested as described in Control A.

The results are shown in Table I.

CONTROL C

The procedure of Control A was repeated except that the resin contained the following ingredients:
100 wt. percent of Polyester resin 3,
1.5 phr of Trigonox 29-B-75, and
0.5 phr of Zelec UN mold release.

A time to peak exothern of about 29 seconds was observed.

The cured composite was removed from the mold after 52 seconds and tested as described in Control A.

The results are shown in Table I.

EXAMPLE 5

The procedure of Control A was repeated except that the resin contained the following ingredients:
80 wt. percent of Polyester resin 3,
20 wt. percent of 2-hydroxyethyl acrylate,
1.5 phr of Trigonox 29-B-75, and
0.5 phr of Zelec UN mold release.

A time to peak exotherm of about 31 seconds was observed.

The cured composite was removed from the mold after 50 seconds and tested as described in Control A.

The results are shown in Table I.

EXAMPLE 6

80 wt. percent of Polyester resin 3,
20 wt. percent of 2-hydroxyethyl methacrylate,
1.5 phr of Trigonox 29-B-75, and
0.5 phr of Zelec UN mold release.

A time to peak exotherm of about 40 seconds was observed.

The cured composite was removed from the mold after 57 seconds and tested as described in Control A. The results are shown in Table I.

reactive and non-reactive acids and anhydrides are used to prepare the unsaturated polyester.

6. A composition as defined in claim 5 wherein the ethylenically non-reactive acid is selected from phthalic acid, isophthalic acid, terephthalic acid and adipic acid.

TABLE I

| Example | Ingredients[1] | Wt. % | Time to Peak Exotherm (sec.) | Molding Time (sec.) | wt. % glass | Properties of Composite Flexural Strength (psi) | Flexural Modulus ($10^6$ psi) |
|---|---|---|---|---|---|---|---|
| Control A | Polyester resin 1 | 100 | 35 | 65 | 65 | 15,500 | 1.35 |
| 1 | Polyester resin 1 HEA | 80 20 | 46 | 65 | 64 | 24,900 | 1.73 |
| 2 | Polyester resin 1 HEMA | 80 20 | 38 | 56 | 64 | 24,200 | 1.65 |
| Control B | Polyester resin 2 | 100 | 39 | 57 | 67 | 20,300 | 1.73 |
| 3 | Polyester resin 2 HEA | 80 20 | 37 | 57 | 67 | 28,300 | 1.82 |
| 4 | Polyester resin 2 HEMA | 80 20 | 46 | 60 | 66 | 27,000 | 1.89 |
| Control C | Polyester resin 3 | 100 | 29 | 52 | 67 | 20,600 | 1.77 |
| 5 | Polyester resin 3 HEA | 80 20 | 31 | 50 | 65 | 26,500 | 1.89 |
| 6 | Polyester resin 3 HEMA | 80 20 | 40 | 57 | 65 | 25,900 | 1.92 |

[1]HEA = 2-hydroxyethyl acrylate
HEMA = 2-hydroxyethyl methacrylate

What is claimed is:

1. A curable molding composition consisting essentially of:
   (a) an unsaturated polyester,
   (b) 2-hydroxyethyl acrylate, 2-hydroxyethyl methacrylate, hydroxypropyl acrylate, hydroxypropyl methacrylate or mixtures thereof,
   (c) an ethylenically unsaturated monomer selected from styrene, its derivatives and homologues, and
   (d) one or more fibers having a melting point or a glass transition temperature above about 130° C., wherein (a) comprises from about 10 to about 75 weight percent of the combined weight of (a), (b), and (c); (b) comprises from about 2 to about 75 weight percent of the combined weight of (a), (b) and (c); (c) comprises from about 10 to about 75 weight percent of the combined weight of (a), (b) and (c); (d) comprises from about 10 to about 75 weight percent of the total composition; and the viscosity at 120° C. of the resinous portion of the composition is less than about 150 centipoise.

2. A composition as defined in claim 1 wherein the diol used to prepare the unsaturated polyester is selected from ethylene glycol, diethylene glycol, propylene glycol, dipropylene glycol, 2,2,4-trimethyl-1,3-pentanediol, 1,3-butanediol, neopentyl, glycol, and the alkoxylated derivatives of bisphenol A.

3. A composition as defined in claim 1 wherein the acid used to prepare the unsaturated polyester is maleic acid or fumaric acid.

4. A composition as defined in claim 1 wherein maleic anhydride is used to prepare the unsaturated polyester.

5. A composition as defined in claim 1 wherein a mixture of ethylenically reactive or of ethylenically 7. A composition as defined in claim 5 wherein the anhydride is phthalic anhydride.

8. A curable composition as defined in claim 1 wherein component (b) comprises 2-hydroxyethyl acrylate.

9. A curable composition as defined in claim 1 wherein component (b) comprises 2-hydroxyethyl methacrylate.

10. A curable composition as defined in claim 1 wherein the ethylenically unsaturated monomer comprises styrene.

11. A curable composition as defined in claim 1 wherein the fiber is selected from fiberglass, carbon fibers, aromatic polyamide fibers, or mixtures thereof.

12. A curable composition as defined in claim 1 which contains a curing initiator.

13. A curable composition as defined in claim 12 wherein the curing initiator is a perester and/or a perketal or a mixture of peresters and/or perketals.

14. A curable composition as defined in claim 12 wherein the curing initiator is an azo and/or peroxide containing compound.

15. A curable composition as defined in claim 12 wherein the curing initiator is a mixture of an azo compound and a perester and/or perketal.

16. A curable composition as defined in claim 12 which contains an acidic cure accelerator.

17. A curable composition as defined in claims 12 or 13 or 14 or 15 or 16 which contains an accelerator comprising a cobalt containing compound.

18. A molded article prepared from the composition of claim 1.

* * * * *

UNITED STATES PATENT AND TRADEMARK OFFICE
CERTIFICATE OF CORRECTION

PATENT NO. : 4,579,890
DATED : April 1, 1986
INVENTOR(S) : Linda A. Domeier

It is certified that error appears in the above-identified patent and that said Letters Patent is hereby corrected as shown below:

Column 4, line 22, "178 inch" should read -- 1/2 inch --.

Column 5, line 56, "Ser. No. 134,906" should read -- Ser. No. 135,906 --.

Claim 2, line 5, "neopentyl, glycol" should read -- neopentyl glycol --.

Signed and Sealed this

Fifth Day of August 1986

[SEAL]

Attest:

DONALD J. QUIGG

Attesting Officer

Commissioner of Patents and Trademarks